US007957528B2

(12) United States Patent
Iwamura

(10) Patent No.: US 7,957,528 B2
(45) Date of Patent: Jun. 7, 2011

(54) NEAR FIELD REGISTRATION OF HOME SYSTEM AUDIO-VIDEO DEVICE

(75) Inventor: Ryuichi Iwamura, Lakeside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 959 days.

(21) Appl. No.: 11/842,408

(22) Filed: Aug. 21, 2007

(65) Prior Publication Data
US 2009/0052667 A1 Feb. 26, 2009

(51) Int. Cl.
*H04N 7/167* (2006.01)
(52) U.S. Cl. .................................................. 380/200
(58) Field of Classification Search ............... 380/200
See application file for complete search history.

(56) References Cited

U.S. PATENT DOCUMENTS

| | | | |
|---|---|---|---|
| 6,782,260 B2 | 8/2004 | Nakakita et al. | |
| 2002/0143643 A1 | 10/2002 | Catan | |
| 2003/0110512 A1 | 6/2003 | Maari | |
| 2003/0130906 A1* | 7/2003 | Maari | 705/26 |
| 2004/0073451 A1 | 4/2004 | Maari | |
| 2004/0107167 A1 | 6/2004 | Maari | |
| 2004/0252840 A1* | 12/2004 | Moriyama et al. | 380/277 |
| 2004/0268132 A1 | 12/2004 | Waris | |
| 2005/0015467 A1 | 1/2005 | Noda | |
| 2005/0105734 A1 | 5/2005 | Bueret et al. | |
| 2005/0253722 A1 | 11/2005 | Droms et al. | |
| 2006/0085635 A1 | 4/2006 | Park | |
| 2006/0087433 A1 | 4/2006 | Sheller | |
| 2007/0025554 A1* | 2/2007 | Ong | 380/278 |
| 2007/0054616 A1 | 3/2007 | Culbert | |
| 2008/0088474 A1 | 4/2008 | Hardacker et al. | |
| 2010/0228995 A1* | 9/2010 | Jacobus et al. | 713/189 |

FOREIGN PATENT DOCUMENTS

| | | |
|---|---|---|
| WO | WO 01/71685 A1 | 9/2001 |
| WO | 2006083416 | 8/2006 |
| WO | WO 2006/127598 A2 | 11/2006 |

OTHER PUBLICATIONS

Robert Hardacker, "System and Method for RFID Transfer of MAC, Keys" U.S. Appl. No. 11/591,922, filed Nov. 2, 2006; Non-Final Office Action dated Nov. 13, 2009 together with amendment filed Nov. 18, 2009.

* cited by examiner

*Primary Examiner* — Jacob Lipman
(74) *Attorney, Agent, or Firm* — John L. Rogitz

(57) ABSTRACT

A near field communication (NFC) sticker which stores a key is attached to a new client device. A remote commander in a home network reads the key using a NFC interface and IR-transmits it to a home network server. Once the client is connected to the network, it encrypts its own device information with the key and sends the encrypted information to the server, which decrypts the data with the key sent from the remote commander. In this way, client device registration is executed easily and securely.

19 Claims, 3 Drawing Sheets

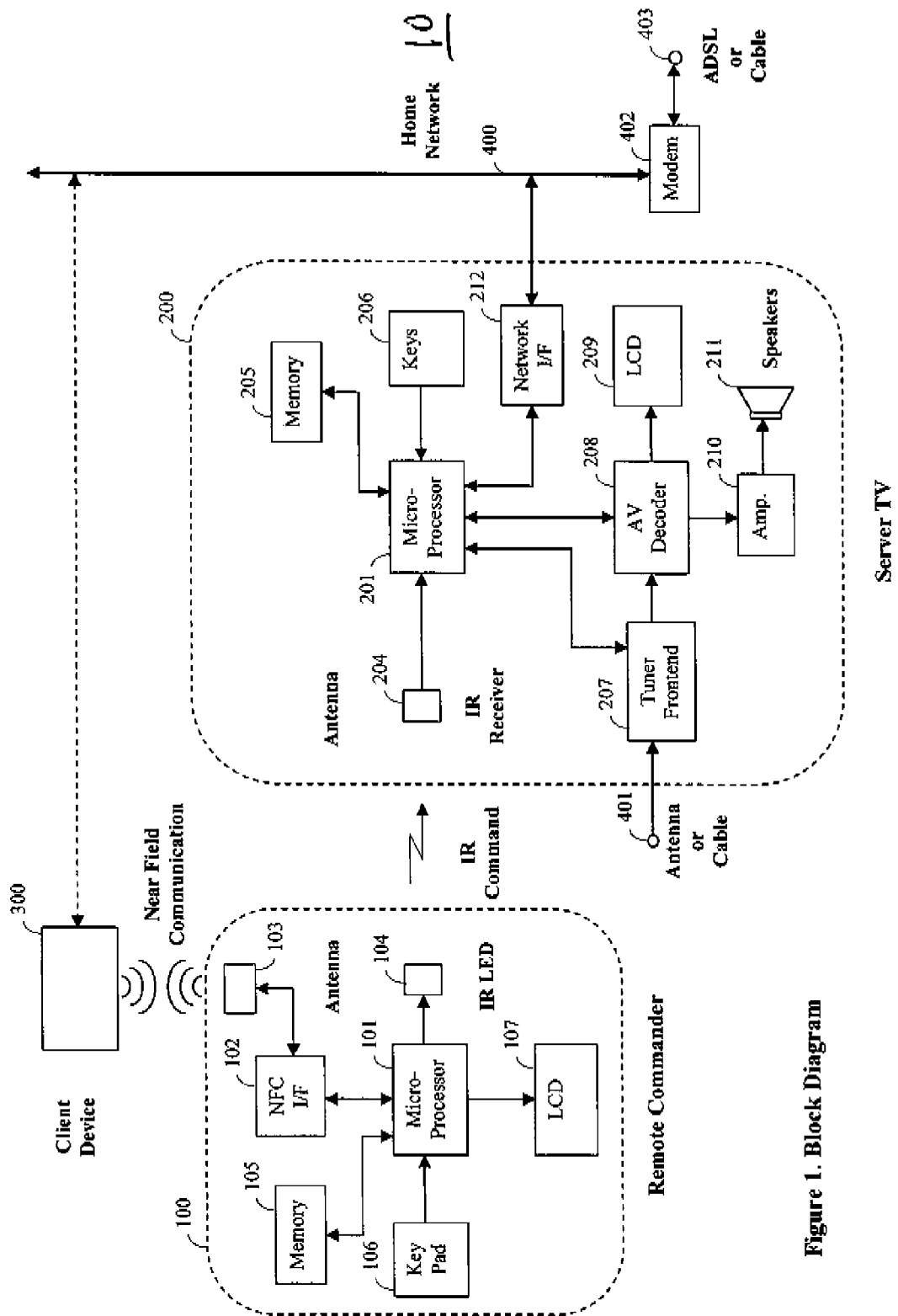
Figure 1. Block Diagram

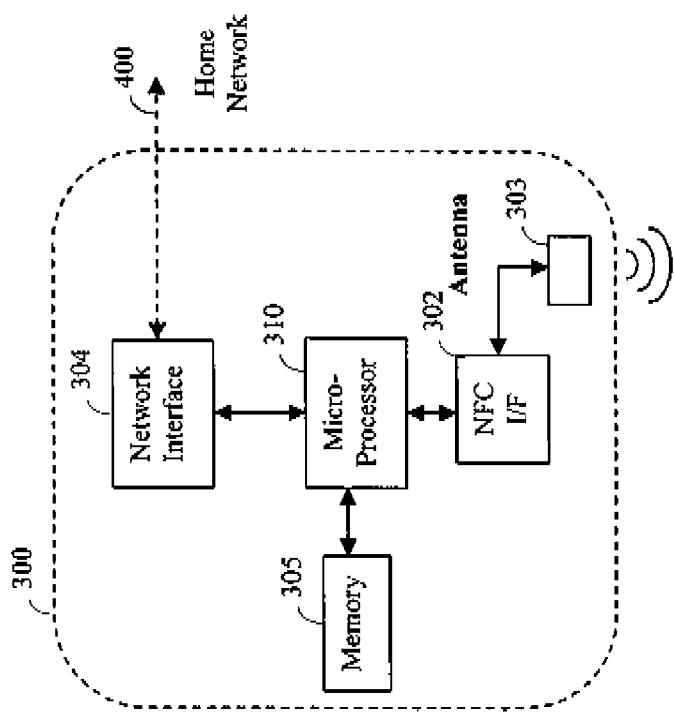
Figure 3. Client Device (2)
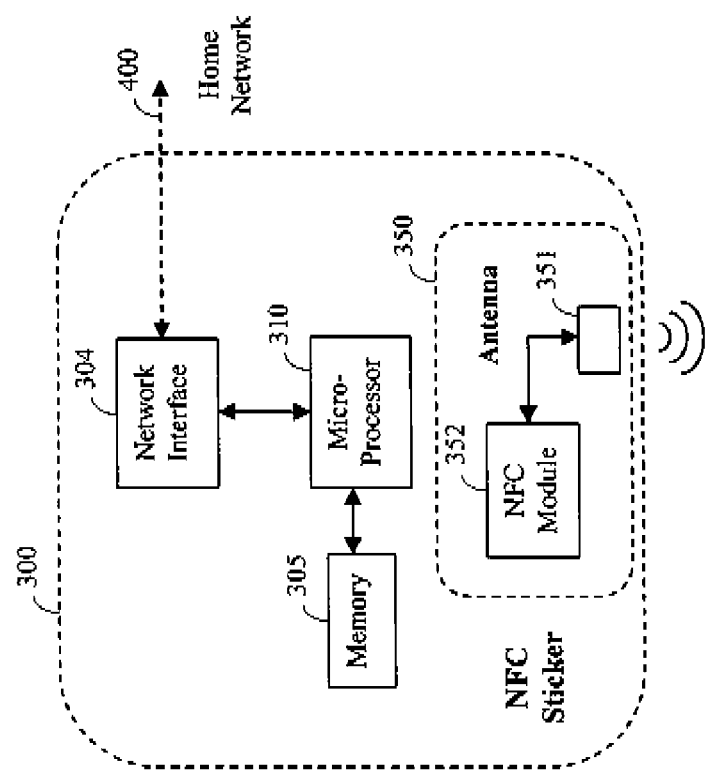
Figure 2. Client Device (1)

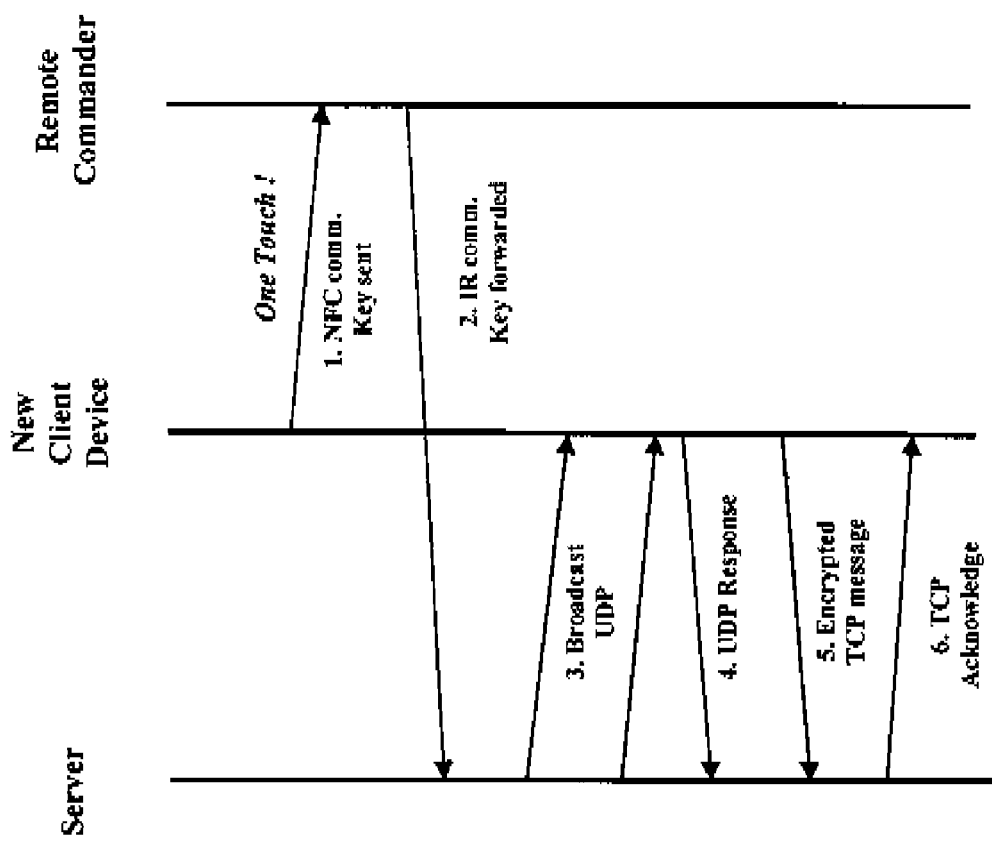
Figure 4. Communications For Device Registration

NEAR FIELD REGISTRATION OF HOME SYSTEM AUDIO-VIDEO DEVICE

I. FIELD OF THE INVENTION

The present invention relates generally to using near field communications (NFC) to register audio-video devices with home networks.

II. BACKGROUND OF THE INVENTION

Attaching new devices such as new digital video disk (DVD) players or digital video recorders (DVRs) to a network such as a home entertainment network can be a trying experience even for engineers, let alone the customers for whom these products are intended. This is because network registration can entail entering long strings of alpha-numeric characters for IP addresses, wired equivalent piracy (WEP) keys, etc.

As recognized herein, to save the user from the above drudgery, near field communication (NFC) may be used, in which the above exchanges can be undertaken automatically between the device sought to be registered and the network using NFC principles such as but not limited radiofrequency identification (RFID) and/or Sony's "Felica" NFC technology. As also recognized herein, it would be desirable to effect NFC registration without requiring the system server (typically the TV) to be pre-fitted with NFC capability, since most are not. Furthermore, as understood herein NFC registration between a relatively large device and a relatively large server entails moving one the large objects sufficiently close to the other to permit NFC. With these recognitions in mind, the invention herein is provided.

SUMMARY OF THE INVENTION

A near field communication (NFC) sticker which stores a key is attached to a new client device. A remote commander in a home network reads the key using a NFC interface and IR-transmits it to a home network server. Once the client is connected to the network, it encrypts its own device information with the key and sends the encrypted information to the server, which decrypts the data with the key sent from the remote commander. In this way, client device registration is executed easily and securely.

Accordingly, a home network includes a hand-held portable remote commander. The remote commander includes a near field communication (NFC) element and a non-NFC wireless transmitter. A client device is sought to be registered with the network, with the client device including an NFC element storing an encryption key readable using NFC principles by the NFC element of the remote commander. A network server that does not have NFC capabilities and that has a wireless receiver receives the key from the non-NFC wireless transmitter of the remote commander.

The NFC element of the remote commander may be a NFC reader or a NFC reader/writer, and the server may be a digital TV. The non-NFC wireless transmitter may be an IR transmitter. In any case, the server can receive encrypted registration information from the client device over the network and decrypt the registration information using the key.

In another aspect, a key is obtained using NFC from a client device sought to be registered on a network. The key is sent to a registration server using a wireless, non-NFC, non-telephony communication mode and used to register the client device with the server.

In still another aspect, a portable intermediate communication device is disclosed that can be implemented by a wireless telephone or a TV remote commander. The device includes a NFC element configured for receiving a key from a client device. The intermediate device also includes a non-NFC non-telephony wireless transmitter for transmitting the key to a server, and a processor for controlling the wireless transmitter.

The details of the present invention, both as to its structure and operations can best be understood in reference to the accompanying drawings, in which like reference numerals refer to like parts, and in which:

BRIEF DESCRIPTION OF THE DRAWINGS

FIG. 1 is a block diagram of a non-limiting network in accordance with present principles;

FIGS. 2 and 3 are block diagrams of non-limiting client devices in accordance with present principles; and FIG. 4 is a timeline diagram showing the registration communication process.

DETAILED DESCRIPTION OF THE PREFERRED EMBODIMENT

Referring initially to FIG. 1, a home network is shown, generally designated 10, which includes at least one client device 300 such as but not limited to a DVD player or PVR or video camera, at least one portable hand-held remote commander 100, and at least one network server 200 such as but not limited to a server TV.

Beginning with the remote commander 100, a microprocessor 101 is provided within the remote commander 100 as shown. As more fully disclosed below, the microprocessor 101 reads certain information from the client device 300 by means of a NFC antenna 103 and associated NFC interface 102. Then, as also described further below, the microprocessor 101 sends the information to the server TV 200 using a non-NFC wireless transmitter such as an IR transmitter 104 (which can be implemented by a light emitting diode (LED)) in accordance with IR communication principles known in the art.

The NFC interface 102/antenna 103, in non-limiting embodiments, may be implemented by a Sony "Felica" chip (also known as a "SUICA" chip) that can be mounted inside or attached to the case of the remote commander 100 or that can be physically separate from the case and connected to the remote commander 100 via a cable such as a universal serial bus (USB) cable. Thus, an RFID writer/reader can be used to implement the present NFC components of the remote commander 100 and/or the NFC components of the client device 300 discussed further below.

In undertaking the present logic illustrated in FIG. 4, the microprocessor 101 of the remote commander 100 executes a software program that may be stored in a memory 105 of the remote commander 100. The memory 105, which may be, without limitation, solid state memory, may also store data such as information read from the client device 300. A keypad 106 is also provided on the remote commander 100 as shown that may be manipulated by a person to, e.g., input a command. The remote commander 100 may also be provided with an output device such as but not limited a liquid crystal display (LCD) 107 that may receive data from the microprocessor 101 to show a message, for example, "Key read", "Key sent to server", etc.

Turning now to the server 200, in one embodiment the server 200 is implemented by a digital TV that can receive audio/video (AV) signals from an antenna or cable network 401 that is tuned in a tuner/frontend 207. The signals are decoded in an AV decoder 208, with the video part of the signals being sent to a TV display such as an LCD panel 209. The audio signals are amplified in an audio amplifier 210 and sent to speakers 211 as shown.

In accordance with digital TV principles known in the art, a TV microprocessor 201 controls the tuner/frontend 207 and the AV decoder 208. Furthermore, the TV microprocessor 201 receives data from an IR receiver 204, with the data representing signals including command signals (e.g., channel up/down, volume control, etc.) received from the IR transmitter 104 of the remote commander 100. The same types of command signals may also be input to the TV microprocessor 201 using manipulable keys 206 on the TV server 200.

In addition to providing output to the tuner frontend 207 and AV decoder 208, as shown in FIG. 1 the TV microprocessor 201 may also communicate with a network interface 212 such as but not limited to an Ethernet interface. The network interface 212 is connected to a home network 400 as shown. The TV microprocessor 201 may also access a server memory 205 such as but not limited to disk-based or solid state memory to execute the present logic and to store data. In any case, the server 200 need not have NFC capabilities.

In some implementations, the home network 400 may be implemented as an Ethernet network or other wired network such as a powerline network. In other implementations the home network 400 may be implemented as a wireless network such as an IEEE 802.11-based network. In any case, the home network 400 can be connected to the Internet 403 using a modem 402 to permit the TV microprocessor 201 to access the Internet.

Having described a non-limiting illustrative remote commander 100 and server 200, attention is now drawn to FIGS. 2 and 3 for an understanding of two non-limiting embodiments of the client device 300 shown in FIG. 1. In accordance with present principles, the client device 300 includes a NFC element 350. In the embodiment shown, the element 350 may be a sticker that can be physically adhered to the client device 300 on the inner or outer surface of the housing of the client device 300. The NFC element 350 may be, without limitation, a RFID reader or and RFID writer, and alternative to adhering it to the client device it may be connected to the client device using a cable such as a USB cable.

As shown, the NFC element 350 includes a NFC antenna 351 and an NFC module 352 that stores data, such as but not limited to an encryption key that preferably is factory-written into the module 352. Additionally, the client device 300 includes a client microprocessor 310 that can execute logic stored in a client memory 305, which may also store a copy of the key in the NFC module 352. Still further, the client device 300 may include a network interface 304 that is configured to communicate with the home network 400 and, hence, with the server TV 200 through the network 400. Additional non-limiting functional blocks may be included in the client device 300. For example, if the client device 300 is a security camera, it may include a CMOS/CCD imager, an A/D converter, a video encoder, etc.

FIG. 3 shows an alternate client device that in all essential respects may be identical in function and structure to the client device shown in FIG. 2, except that the client device 300 shown in FIG. 3 may include, instead of the sticker 350, a NFC antenna 303 and NFC interface 302, with the above-mention key being stored in the client device memory 305 and sent to the remote commander 100 using the NFC interface 302 and the antenna 303.

In addition to the encryption key, the client device stores device information including, example, device name, type, serial number, MAC address, etc. The device information may be encrypted with the key, so that once the client device 300 is connected to the network 400, the client device can send its encrypted device information to the server TV 200 over the network 400. In non-limiting implementations, DES or AES encryption can be used. In less preferred embodiments, both the key and the device information including, example, device name, type, serial number, MAC address, etc. can be sent using NFC to the remote commander 100 and from the remote commander 100 to the server 200 using IR.

Thus, in the preferred embodiment, the TV microprocessor 201 receives the key that is IR-transmitted from the remote commander 100 and stores it in the TV memory 205. The TV microprocessor 201 also receives the encrypted data from the client device 300 over the network 400. The microprocessor 201 decrypts the encrypted data with the key and registers the client device 300 as a new network device.

FIG. 4 illustrates the above-discussed communications between these devices. First, the remote commander 100 is touched to the new client device 300 and the key is sent from the client device 300 to the remote commander 100 via NFC, as indicated at step (1). Then, at step (2) the key is IR-transmitted from the remote commander 100 to the server TV Note that an adversary cannot monitor the IR message outside the room. The server TV 200 then broadcasts, e.g., a User Datagram Protocol (UDP) message over the network at step (3) to prompt the client device 300 to respond. At step (4) the client device 300 returns an appropriate UDP response and at step (5) sends the above-mentioned encrypted data to the server TV using, e.g., Transmission Control Protocol (TCP). The server returns a TCP acknowledge message to the client device 300 to let the client device know that the message was received, step (6).

Note that the UDP message exchange discussed above advantageously may be used because the server 200 and the client 300 do not know each other at the beginning of the communications. After the UDP message exchange, they know with whom they should communicate.

It is preferred that the IR communication discussed above is sufficiently fast and stable to send a 64-bit or longer encryption key.

The non-NFC communication method between the remote commander 100 and the server TV 200 is not limited to IR communication. A wireless communication, for example, so-called "ZigBee" communication, may be used. In the case of wireless non-NFC communication, it is advantageous that the remote commander and the server TV share another common key to prevent an adversary from monitoring wireless communication. For example, the server TV might show a key number on the screen. The user can enter the key number to the remote commander using the keypad 106. The original key of the client device can then be encrypted with this common key and sent to the server TV.

Optionally, the remote commander 100 may have e-payment capability. In this case, the remote commander can read a prepaid NFC card presented by the user. If a charge is successfully withdrawn, the remote commander IR-transmits a purchase ID to the server TV. The server TV can then access a pay-per-view program with the purchase ID and obtain a decoding permission.

In some implementations the remote commander hardware may be built in a wireless telephone, recognizing that some wireless phones already have a NFC interface and e-payment applications. A non-NFC wireless transmitter (e.g., the IR LED mentioned above) is supplied on the wireless phone in addition to its wireless telephony transmitter, such that the modified cell phone can then be used as the above-described remote commander.

It may now be appreciated that the system and method described above is easy to use. The user only needs to touch a new device with the remote commander to effect registration of the device. The system and method presented herein can easily register large, heavy, non-portable devices, and is secure, because device information is encrypted and sent over the network. It is most difficult to connect an illegal device to the network. Also, the system and method herein is a low cost solution because, e.g., the server TV needs no NFC interface. And, if a cell phone is used, only an IR LED and small software addition are required.

While the particular NEAR FIELD REGISTRATION OF HOME SYSTEM AUDIO-VIDEO DEVICE is herein shown and described in detail, it is to be understood that the subject matter which is encompassed by the present invention is limited only by the claims.

What is claimed is:

1. A home network, comprising:
a hand-held portable remote commander including:
a near field communication (NFC) element; and
at least one non-NFC wireless transmitter;
a client device sought to be registered with the network, the client device including at least one NFC element storing at least one encryption key readable using NFC principles by the NFC element of the remote commander; and
a network server not having NFC capabilities and having a wireless receiver receiving the key from the non-NFC wireless transmitter of the remote commander.

2. The network of claim 1, comprising a display presenting a secondary key to a user to facilitate the user knowing the secondary key, the remote commander receiving the secondary key from user input, the encryption key being encrypted with the secondary key prior to sending the encryption key to the network server.

3. The network of claim 1, wherein the NFC element of the remote commander is a NFC reader.

4. The network of claim 1, wherein the NFC element of the remote commander is a NFC reader/writer.

5. The network of claim 1, wherein the server is a digital TV.

6. The network of claim 1, wherein the non-NFC wireless transmitter is an IR transmitter.

7. The network of claim 1, wherein the server receives encrypted registration information from the client device over the network and decrypts the registration information using the key.

8. A method comprising:
obtaining at least one key from a client device sought to be registered on a network using NFC;
sending the key to at least one registration server using a wireless, non-NFC, non-telephony communication mode; and
using the key to register the client device with the server.

9. The method of claim 8, further comprising:
presenting a secondary key on a display so that it is visible to a person;
receiving user input of the secondary key; and
encrypting the at least one key with the secondary key prior to sending the at least one key to the server using the wireless, non-NFC, non-telephony communication mode.

10. The method of claim 8, wherein the wireless, non-NFC, non-telephony communication mode is IR.

11. The method of claim 8, comprising using a wireless telephone to execute the obtaining and sending acts.

12. The method of claim 8, comprising:
sending, from the client device to the server over a non-NFC network, encrypted registration information; and
at the server, using the key to decrypt the registration information.

13. The method of claim 8, comprising using a TV remote commander to execute the obtaining and sending acts.

14. The method of claim 13, comprising using a TV to undertake the act of using the key to register the client device.

15. A portable intermediate communication device, comprising:
at least one NFC element configured for receiving at least one key from a client device;
at least one non-NFC non-telephony wireless transmitter for transmitting the key to a server; and
a processor controlling the wireless transmitter.

16. The device of claim 15, further comprising a user input device receiving human input indicating a secondary key, the device encrypting the at least one key with the secondary key prior to transmitting the at least one key to the server using the non-NFC non-telephony wireless transmitter.

17. The device of claim 15, wherein the device is a wireless telephone.

18. The device of claim 15, wherein the device is a TV remote commander.

19. The device of claim 18, wherein the server is a TV.

* * * * *